July 22, 1952  L. E. MARCHANT  2,604,188
OIL SUPPLY AND SCAVENGE SYSTEM
Filed Aug. 19, 1949  2 SHEETS—SHEET 1

INVENTOR
LAWRENCE E. MARCHANT
PER
ATTORNEY

July 22, 1952   L. E. MARCHANT   2,604,188
OIL SUPPLY AND SCAVENGE SYSTEM
Filed Aug. 19, 1949   2 SHEETS—SHEET 2
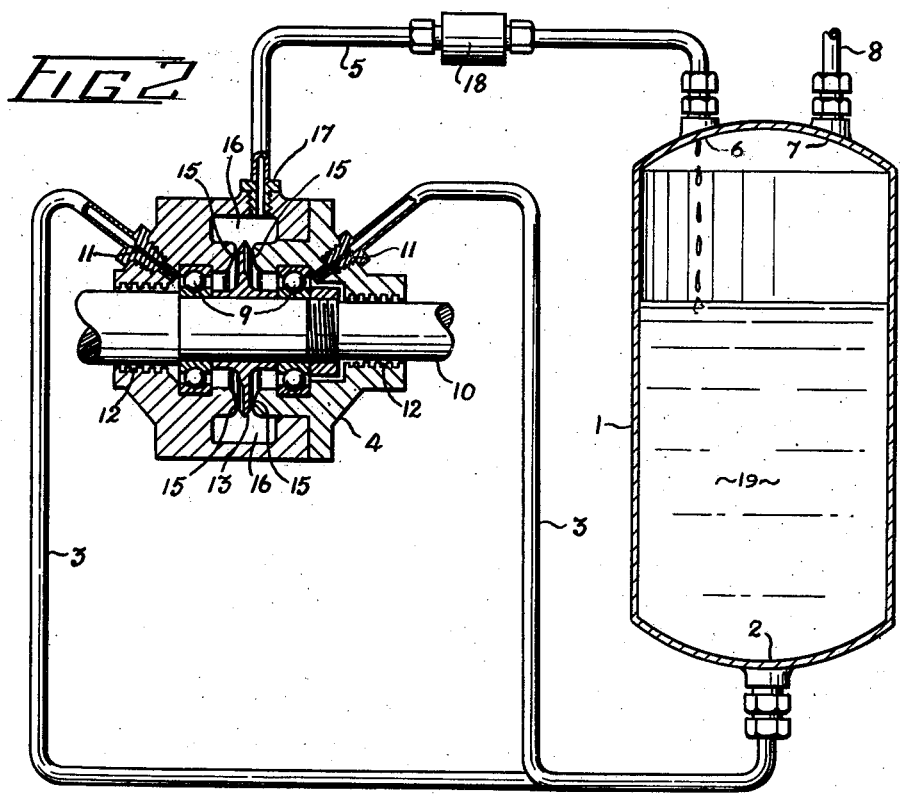
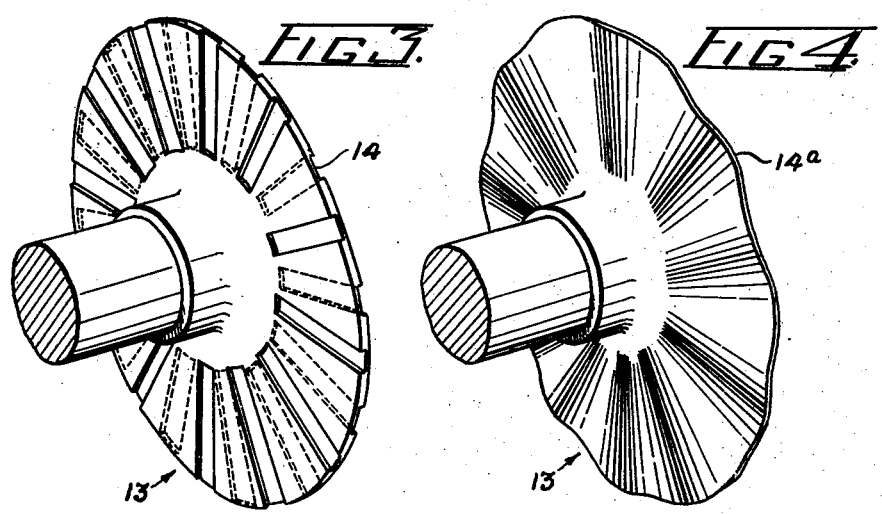
INVENTOR
LAWRENCE E. MARCHANT.
ATTORNEY.

Patented July 22, 1952

2,604,188

UNITED STATES PATENT OFFICE 2,604,188

OIL SUPPLY AND SCAVENGE SYSTEM

Lawrence Edgar Marchant, Toronto, Ontario, Canada, assignor to A. V. Roe Canada Limited, Malton, Ontario, Canada, a corporation Application August 19, 1949, Serial No. 111,154

8 Claims. (Cl. 184—6)

This invention relates to improvements in lubrication systems for mechanisms which are designed to operate at a high rate of speed, and more particularly to lubrication systems for gas turbine engines.

A main object of the invention is to provide a heavy duty bearing unit which includes its own pressure lubrication system.

Another object of this invention is to provide a lubrication system embodying a positive oil supply means and an oil scavenge means which is particularly adapted to take advantage of the high operating speeds which characterize mechanisms to which such systems may be applied. In the application to a gas turbine engine, the supply means consists of a tank or reservoir of oil under static air pressure provided by the engine compressor, while the scavenge means consists essentially of one or more of the heavy duty bearing units constructed according to this invention and mounted directly on the main shaft to function by virtue of the high rotational speed characteristic of such an engine.

A further object of this invention is to eliminate the necessity for the normal oil pump and scavenge pump and their associated drives, thus saving considerable weight and mechanical complication.

Another object of the invention is to provide a ready means of controlling the maximum engine speed. Since the pressure in the scavenge system will increase progressively with the engine speed it can be employed to operate a limit switch to cut off the fuel supply to the engine when the maximum permissible speed is exceeded.

All of the foregoing as well as other objects and advantages of the invention will become apparent from a study of the following specification, taken in conjunction with the accompanying drawings, wherein like characters of reference indicate corresponding parts throughout the several views and wherein:

Fig. 2 is a diagrammatic view partly in section of the lubrication system constructed in accordance with this invention;

Fig. 3 is a perspective view of the disc; and

Fig. 4 is a perspective view of an alternative form of the disc.

Figure 1:
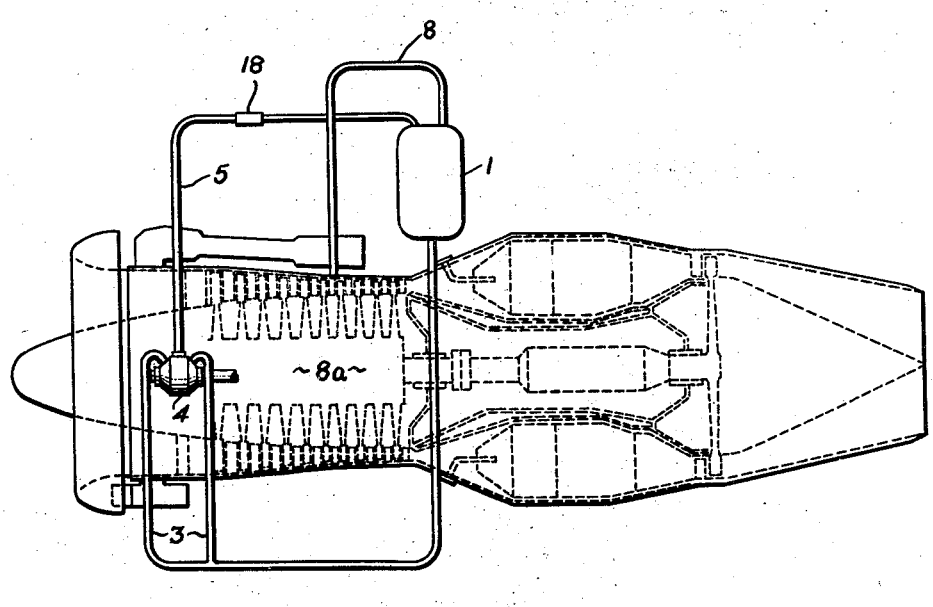
Fig. 1 is a diagrammatic view of a gas turbine engine embodying the oil supply and scavenge system according to the invention.

The lubricating system illustrated comprises a pressure-tight tank 1 having an outlet 2 from which oil is conducted through pipe lines 3, 3 to a bearing housing 4, whence it is returned as scavenge oil through a pipe line 5 to inlet 6 of the tank 1. Air pressure is applied to the tank through an inlet 7 which is connected by the pipe 8 to a source of static pressure: in a gas turbine installation the source of pressure may conveniently be a suitable stage in the main compressor 8a of the engine.

The bearing housing 4 carries two anti-friction bearings 9 supporting the shaft 10. Oil entering the housing from the pipe lines 3, 3 is directed upon the anti-friction bearings by the jets 11, 11 and the escape of oil along the shaft is prevented by glands or seals 12, 12 provided on either side of the bearing assembly. Between the bearings 9, the shaft carries a disc 13 which is securely mounted on the shaft so that the disc rotates therewith: this mounting can be effected by means of pinning, keying, or other methods well known in the art. As shown in Fig. 2, radial grooves 14 are formed in both faces of the disc, the grooves on one face being staggered in relation to the grooves on the other. Alternatively the disc may have radial corrugations 14a as shown in Fig. 3: the corrugations of this construction are equivalent to the grooves of the construction shown in Fig. 2. The disc rotates between lips 15, 15 of the bearing casing 4 so that the outer periphery of the disc lies in an annular space 16 of the housing 4. The clearance between the disc 13 and the lips 15, 15 is made as small as possible without actually allowing rubbing contact between the fixed and rotating parts, so that the annular space 16 is virtually closed around its inner diameter except where the grooves 14 or corrugations 14a run radially into it.

The outlet from the annular space 16 is connected through an adapter 17 to the pipe line 5. Between the bearing and the tank a non-return valve 18 is installed in the pipe line 5, the purpose of which will be understood from the following description of the operation of the system.

When the engine is running, a static air pressure from the compressor is applied through the pipe 8 to the air space above the oil 19 in the tank 1. This pressure may be of the order of 20 lbs./sq. in. at normal operational speed. It will be appreciated that the application of this pressure does not constitute an actual bleed from the compressor and no air from the compressor is wasted in applying pressure to the oil system. Under the influence of this pressure, the oil is caused to flow from the tank 1 through pipe lines 3, 3 to the jets 11, 11 whereby it is directed upon the anti-friction bearings 9. After passing through the bearings, the oil flows onto the disc 13 which is rotating at high speed with the shaft, and which acts as a centrifugal pump to deliver oil under pressure to the annular space 16. The grooves 14 or corrugations 14ª act as vanes so that the action of the disc as a centrifugal pump is not entirely dependent on the surface friction between the disc and the oil; it is important that the clearance between the lips 15, 15 and the disc should be as small as practicable to prevent reverse flow of oil from the annular space 16 through these clearances.

By a choice of the proportions of the disc in relation to the speed of rotation, the pressure generated in the annular space 15 is so chosen that it is substantially higher than the static air pressure in the tank 1; 35 lbs./sq. in. at normal engine speed is a suitable figure. Thus oil will be returned to the tank through the pipe line 5, entering the tank through the inlet 6.

Under normal operating conditions, the above sequence insures that oil is supplied from the tank to the bearing assembly and is returned from the bearing assembly to the tank, the circulation being maintained by the pressure differential between the tank 1 and the annular space 16. The relationship between the two pressures will remain substantially constant at the desired value since the pressure at the compressor stage to which the tank 1 is connected and the pressure generated by the rotating disc 13 are both dependent on the speed of the compressor.

The non-return valve 18 is required for starting conditions. When the engine is first turned by the starter motor, the bearings 9 are lubricated by the residual oil from previous runnings, and within a very short time air pressure is generated by the compressor and applied to the oil in the tank 1. However, until sufficient time has elapsed to enable the oil to flood the bearing housing, the disc 13 will rotate as an unprimed centrifugal pump and no pressure will be generated in the annular space 16 and the pipe line 5. It will be clear, therefore, that unless there is a non-return valve in the pipe line 5, the air pressure in the tank 1 will escape up the pipe line 5 and enter the bearing housing. This pressure would effectively balance the pressure of the oil supply in the pipe lines 3, 3 and no oil would flow into the bearings. For this reason the non-return valve 18 is installed in the pipe line 5 to eliminate the application of back pressure to the bearing housing and to enable the centrifugal disc 13 to become primed, thereby establishing normal circulation of the oil.

In an aircraft installation of a gas turbine engine it may also be desirable to install a non-return valve in the pipe line 8 to prevent oil from the tank 1 being forced back up this pipe line into the engine compressor under conditions of negative G. This refinement and the stack-pipe arrangement which will be required to ensure a constant supply of oil under such conditions are not described in detail or shown herein, since they will be understood by those skilled in the art.

Another feature of the invention which has not been illustrated but which can be readily appreciated, is the application of this invention to provide an overspeed control for the engine. The values of 20 lbs./sq. in. for the supply pressure, and 35 lbs./sq. in. for the scavenge pressure as previously mentioned are intended to represent typical standard conditions of operation of the engine. These pressures will, of course, vary as the speed of the engine varies: both pressures will increase with increasing speed and both will decrease with decreasing speed. The pressure in the pipe line 5 may be employed to operate a pressure sensitive control of the fuel supply to the engine, and at the maximum permissible speed of the engine, this control can cut off the supply, thereby preventing further acceleration.

Where the necessity for a positive supply of oil is less acute, as where stable operating conditions are assured, the static air pressure supply may be dispensed with, and the oil circulation maintained under the pressure differential set up by the disc 13 rotating in the annular space 16. The bearing assembly then constitutes a self-lubricating bearing unit containing one or more bearings for the shaft; several of such units may be provided along the shaft.

It is thought that the construction and use of the invention will be apparent from the above description of the various parts and their purpose. Although this invention has been described as applied to a single bearing assembly in an engine, any number of bearings may be supplied from a common tank, each bearing being equipped with the simple disc type centrifugal pump for scavenge purposes. The form of the invention herewith shown and described is to be taken as a preferred example only, and various changes in the shape, size and arrangement of the parts, particularly with respect to the form of the impeller disc 13, may be resorted to without departing from the spirit of the invention or the scope of the subjoined claims.

What I claim as my invention is:

1. A lubrication system for the bearings of a shaft rotating at high speeds having, in combination, an air compressor mounted on the shaft, a tank containing a lubricant and connected to a pressure output of the compressor to obtain a tank pressure substantially proportional to the speed of the shaft, a centrifugal pump having a rotor mounted on the shaft to rotate therewith for creating a pressure substantially proportional to the speed of the shaft to return the lubricant to the tank, means for conducting the lubricant from the tank through the bearings to the centrifugal pump, and means for conducting the lubricant from the centrifugal pump to the tank, the pressure generated by the pump being greater than the tank pressure throughout the range of operational speeds of the shaft.

2. A lubrication system for the bearings of a shaft rotating at high speeds having, in combination, an air compressor mounted on the shaft, a tank containing a lubricant, a conduit connecting the tank to a pressure output of the compressor to obtain a tank pressure substantially proportional to the speed of the shaft, a disc adjacent the bearings and mounted on the shaft to rotate therewith, means for conducting the lubricant from the tank to the bearings, a housing for the bearings having an annular space therein, the periphery of the disc lying within the annular space in the housing for creating a pressure in the annular space substantially proportional to the speed of the shaft to return the lubricant to the tank, and means for conducting the lubricant from the annular space in the housing to the tank, the pressure of the lubricant in the last named conducting means being greater than the tank pressure throughout the range of operational speeds of the shaft.

3. A lubrication system for the bearings of a shaft rotating at a high speed having, in combination, a tank containing a lubricant, means for applying air pressure to the tank, the tank pressure being substantially proportional to the speed of the shaft, a centrifugal pump having a rotor mounted on the shaft to rotate therewith for creating a pressure, means for conducting the lubricant from the tank through the bearings to the centrifugal pump, means for conducting the lubricant from the centrifugal pump to the tank, the pressure created by the centrifugal pump being greater than the tank pressure throughout the range of operational speed of the shaft, and positive means in the last-named conducting means for preventing the passage of the contents of the tank from the tank through said last-named conducting means to the pump.

4. A lubrication system for a gas turbine engine having compressor and turbine rotors mounted on a shaft supported by anti-friction bearings, comprising a tank containing a lubricant, the said tank being subjected to air pressure from the compressor, a housing for the bearings having an annular space therein, a disc mounted on the shaft to rotate therewith adjacent to the bearings, the said disc having radial depressions therein, the periphery of the disc lying within the annular space in the housing for creating a pressure therein, means for conducting the lubricant from the tank to the housing and introducing it to the bearings on the side thereof remote from the disk, means for conducting the lubricant from the annular space in the housing to the tank, and a non-return valve in the last named conducting means, the pressure created by the disc in the annular space in the housing being greater than the pressure of the compressor applied to the tank throughout the range of operational speed of the engine.

5. A lubrication system for the bearings of a shaft rotating at high speeds and on which is mounted an air compressor, comprising, a tank containing a lubricant, a conduit connecting the tank to a pressure output of the compressor to obtain a tank pressure substantially proportional to the speed of the shaft, a centrifugal pump having a rotor mounted on the shaft to rotate therewith for creating a pressure, means for conducting the lubricant from the tank through the bearings to the pump, sealing means surrounding the shaft adjacent the pump for preventing escape of the lubricant along the shaft away from the pump, and means for conducting the lubricant from the pump to the tank, the pressure created by the pump being greater than the tank pressure throughout the range of operational speeds of the shaft.

6. A lubrication system for a bearing of a shaft rotating at high speeds and on which is mounted an air compressor, comprising, a tank containing a lubricant, a conduit connecting the tank to a pressure output of the compressor to obtain a tank pressure substantially proportional to the speed of the shaft, a housing for the bearing having an annular space therein, a disc mounted on the shaft to rotate therewith adjacent the bearing, the faces of the disc having radially disposed depressions therein, the periphery of the disc lying within the annular space in the housing for creating a pressure therein, means for conducting the lubricant from the tank to the housing and introducing it to the bearing on the side thereof remote from the disc, and means for conducting the lubricant from the annular space in the housing to the tank, the pressure created by the disc in the annular space in the housing being greater than the pressure of the compressor applied to the tank throughout the range of operational speeds of the shaft.

7. A lubrication system for a bearing of a shaft rotating at high speeds and on which is mounted an air compressor, comprising, a tank containing a lubricant, a conduit connecting the tank to the output of the compressor to obtain a tank pressure substantially proportional to the speed of the shaft, a housing for the bearing having an annular space therein, a disc mounted on the shaft to rotate therewith adjacent the bearing, the periphery of the disc lying within the annular space in the housing for creating a pressure therein, a jet in the housing and spaced from the bearing for directing lubricant on the bearing on the side thereof remote from the disc, means for conducting the lubricant from the tank to the jet, and means for conducting the lubricant from the annular space in the housing to the tank, the pressure created by the disc in the annular space in the housing being greater than the pressure of the compressor applied to the tank throughout the range of operational speeds of the shaft.

8. A lubrication system for a bearing of a shaft rotating at high speeds and on which is mounted an air compressor, comprising, a tank containing a lubricant, a conduit connecting the tank to a pressure output of the compressor to obtain a tank pressure substantially proportional to the speed of the shaft, a housing for the bearing having an annular space therein, a disc mounted on the shaft to rotate therewith adjacent the bearing, the faces of the disc having radially disposed depressions therein, the periphery of the disc lying within the annular space in the housing for creating a pressure therein, a jet in the housing and spaced from the bearing for directing lubricant on the bearing on the side thereof remote from the disc, means for conducting the lubricant from the tank to the jet, means for preventing escape of the lubricant along the shaft away from the bearing, means for conducting the lubricant from the annular space in the housing to the tank, the pressure created by the disc in the annular space in the housing being greater than the pressure of the compressor applied to the tank throughout the range of operational speeds of the shaft.

LAWRENCE EDGAR MARCHANT.

REFERENCES CITED

The following references are of record in the file of this patent:

UNITED STATES PATENTS

| Number | Name | Date |
| --- | --- | --- |
| 2,370,581 | Reed | Feb. 27, 1945 |
| 2,464,063 | Streid | Mar. 8, 1949 |
| 2,492,020 | Thoresen | Dec. 20, 1949 |

FOREIGN PATENTS

| Number | Country | Date |
| --- | --- | --- |
| 512,991 | Great Britain | Oct. 2, 1939 |
| 525,769 | France | June 16, 1921 |
| 96,280 | Austria | Mar. 10, 1924 |